US008073730B2

(12) United States Patent
Vanbeck et al.

(10) Patent No.: US 8,073,730 B2
(45) Date of Patent: Dec. 6, 2011

(54) MODELING AND FORECASTING SERVICE PERFORMANCE

(75) Inventors: Andrew Norman Vanbeck, Newport Pagnell (GB); Steven Horgan, West Sussex (GB); Andrew Hunter Shankle, London (GB)

(73) Assignee: Accenture Global Services Limited, Dublin (IE)

( * ) Notice: Subject to any disclaimer, the term of this patent is extended or adjusted under 35 U.S.C. 154(b) by 1182 days.

(21) Appl. No.: 11/775,331

(22) Filed: Jul. 10, 2007

(65) Prior Publication Data

US 2009/0018847 A1  Jan. 15, 2009

(51) Int. Cl.
*G06F 9/46* (2006.01)

(52) U.S. Cl. ...................................... 705/7.38

(58) Field of Classification Search .............. 705/7, 7.38
See application file for complete search history.

(56) References Cited

U.S. PATENT DOCUMENTS

| | | | | |
|---|---|---|---|---|
| 6,055,513 | A * | 4/2000 | Katz et al. .................. | 705/26.41 |
| 6,701,342 | B1 * | 3/2004 | Bartz et al. .................... | 709/200 |
| 6,792,459 | B2 * | 9/2004 | Elnozahy et al. ............. | 709/224 |
| 7,058,704 | B1 * | 6/2006 | Mangipudi et al. ........... | 709/223 |
| 7,065,496 | B2 * | 6/2006 | Subbloie et al. .............. | 705/7.35 |
| 7,099,936 | B2 * | 8/2006 | Chase et al. .................. | 709/223 |
| 7,870,014 | B2 * | 1/2011 | Baughn et al. ..................... | 705/7 |
| 2002/0099579 | A1 * | 7/2002 | Stowell et al. .................... | 705/7 |
| 2005/0066026 | A1 * | 3/2005 | Chen et al. .................... | 709/224 |
| 2008/0010293 | A1 * | 1/2008 | Zpevak et al. .................. | 707/10 |

OTHER PUBLICATIONS

Marilly et al (Requirements for service level agreement management), Dec. 2002, IP Operations and Management, IEEE Workshop on pp. 57-62.*
Jin et al (Analysis on Service Level Agrrement on Web Services), Dec. 2002, HP Invent, pp. 1-13.*
Ludwig et al (Web Service Level Agreement (WSLA) Language Specification), Dec. 2001, IBM Corporation, pp. 1-110.*
Keller et al (Defining and monitoring Service Level Agreements for Dynamics E-Business), Dec. 2002, IBM T. J. Watson ResearchCenter, pp. 189-204.*

* cited by examiner

*Primary Examiner* — Romain Jeanty
(74) *Attorney, Agent, or Firm* — Mannava & Kang P.C.

(57) ABSTRACT

A method for modeling a financial risk in a service level agreement (SLA) between a service provider and a customer for the service provider to provide one or more services to the customer is provided. The method includes forecasting a service performance of the service provider for at least one performance metric of the SLA, modeling at least one scenario for the SLA based on one or more negotiated terms between the service provider and the customer as found in the SLA, and applying the forecasted service performance of the service provider against the at least one modeled SLA scenario to calculate a financial risk of the service provider with regard to the at least one modeled SLA scenario.

16 Claims, 4 Drawing Sheets

MODELING AND FORECASTING SERVICE PERFORMANCE

BACKGROUND

Service providers such as management consulting, technology services, and outsourcing companies rely on service level agreements (SLAs) to provide contractual services to customers. As referred herein, a SLA is a negotiated agreement between a service provider and its customer for the former to provide one or more services to the latter at agreed-upon service level(s). The customer also may be another service provider. Thus, a typical SLA specifies the levels of availability, serviceability, performance, operation, financial incentives (rewards and penalties) and other desired attributes of the service(s) to be provided. To that extent, a SLA includes one or more service performance metrics with corresponding service level objectives (SLOs). Examples of service performance metrics (hereinafter, "SLA metrics" or "metrics") include but are not limited to project milestones delivered or completed on time, critical projects completed on time, and different levels of incidents resolved with different predetermined time periods. As referred herein, a performance of a SLA metric (or SLA metric performance) is expressed as an achieved percentage of the SLO for such a metric. For example, a performance of 70% for project milestones delivered on time with a SLO that all project milestones be delivered on time would indicate that only 70% of all project milestones were delivered on time.

It is difficult for service providers to objectively evaluate and compare the risk of disparate and complex metrics in a SLA in order to predict or forecast their performance and associated financial risks to the service providers. While solution architects and service providers, through their experience dealing with past SLAs, are able to reasonably predict the mean and variability (e.g., standard deviation) of performance of SLA metrics over the lifespan of a SLA, they cannot predict the exact performance of a SLA metric on a desired periodic basis, such as a month-to-month performance.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Described herein are methods and systems for providing a modeling tool or framework that is operable to assist service providers, customers, and any other users with making objective SLA negotiating decisions. According to one embodiment, the modeling tool is operable to systematically and quantitatively model the projected performance of desired metrics in a SLA over the SLA lifespan based solely on the predicted mean and standard deviation of the projected SLA metric performance that solution architects are capable of forecasting. In another embodiment, the modeling tool is also operable to compare relative performance of diverse SLA scenarios based on, for example, customer-proposed performance targets and service-provider-proposed performance targets for SLA metrics, in order to better evaluate or model the financial risk associated with each scenario. In still another embodiment, the modeling tool is further operable to predict the long-term average number of failures against given performance targets of SLA metrics, and therefore, associated financial risks, through simulation of the projected performance models.

Figure 1:
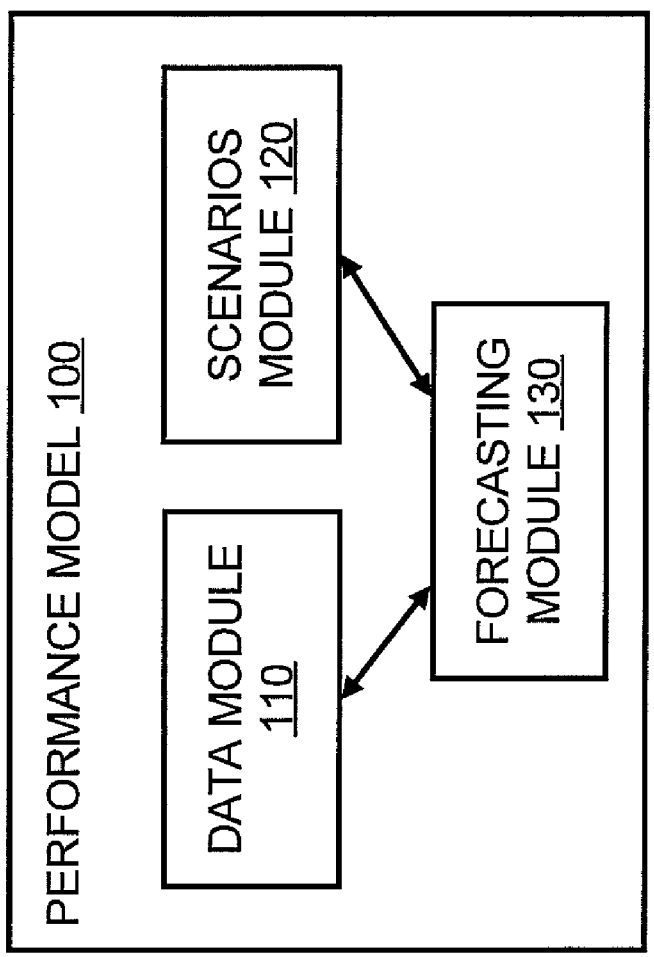
FIG. 1 illustrates a modeling tool or framework 100 for modeling and forecasting performance of SLA metrics, in accordance with one embodiment.

FIG. 1 illustrates a modeling tool or framework 100 for modeling and forecasting performance of SLA metrics, in accordance with one embodiment. The modeling tool 100 includes a data module 110, a scenarios module 120, and a forecasting module 130. Each of these modules is described below.

The data module 110 is operable to create or derive a performance model for each SLA metric of interest in order to generate forecasted performance data for the SLA metric. In the case of available past, actual performance data for a baseline time period (e.g., past service performance data provided by a SLA customer), such actual performance data is also entered into the data module 110 to be included in the performance model. In one embodiment, the data module 110 is operable to model each SLA metric performance based solely on the forecast of performance mean and standard deviation of such a metric, as may be reasonably predicted or forecasted by the solution architects. For example, a typical SLA metric performance exhibits an approximately normal distribution (bell curve) with a mean $\mu$ to simulate the average of the service performance and a standard deviation $\sigma$ to simulate the real life variability of the service performance. It should be noted that for such a standard normal curve, 68% of the results lie within one (1) standard deviation of the mean, 95% within two (2) standard deviations of the mean, and 99% within three (3) standard deviations of the mean. Also, the performance of a SLA metric is typified by lower performance (and thus a low mean, e.g., $\mu = 70\%$) and high variability of performance (and thus a high standard deviation, e.g., between 50-90% or $\sigma = 6.7\%$) early on in the SLA lifespan, with performance increasing (and thus a higher mean) and variability of performance decreasing (and thus a lower standard deviation) throughout the SLA lifespan, usually leveling off at some point later in the lifespan (e.g., at higher mean $\mu = 85\%$ with variability between 80-90% or $\sigma = 1.7\%$). This is because the service provider of the SLA is expected to improve its performance over time.

It should be understood that the SLA metric performance may be approximated by a probability distribution other than the aforementioned normal distribution, such as the gamma distribution, the inverse-gamma distribution, linear distribution, etc. Again, the mean and variance of each approximated probability distribution may be reasonably forecasted by the solution architects.

Although the forecasted μ and σ may be entered based on a long-term basis (e.g., annually for each contract year) the data module 110 is operable to interpolate between the long-term periods (e.g., contract years) and calculate the forecasted metric performance values for each long-term period and for time segments (e.g., monthly) therein in order to model the SLA metric performance. To that effect, the mean performance for the smaller time segments in a particular long-term period is assumed to follow linearly or a straight-line between two endpoints of the long-term period. For example, if $\mu_1$ for Month 1 was 83% and $\mu_{12}$ for Month 12 was 95% in a contract year, $\mu_6$ for Month 6 is set at 89%. Conversely, σ remains static for the entire long-term period. For example, if $\sigma_1$ is 1.5%, the model will use σ = 1.5% for all Months 1-12 in a contract year.

The normal curve used in the performance model is represented by a probability distribution that includes pre-generated, predetermined number of value points (e.g., 1000 points) that follows a standard normal distribution curve with a normalized value of 1, a mean μ of zero (0) and a standard deviation or of one (1). As noted earlier, because 99% of the results in a standard normal distribution occur within three (3) standard deviations of the mean, it may be assumed that effectively all service performance results will occur within three (3) standard deviations of the selected mean. In computational terms as further described below with reference to the forecasting module 130, the performance model for a particular time segment (e.g., a particular month) selects at random one of the value points listed in the probability distribution. The returned value, x, of the selected value point is then multiplied by the entered (predicted) σ, and then added to the entered (predicted) μ, so as to return a curve that is centered around the predicted mean μ with standard deviation σ, or:

$$x_{simulated} = (x_{random} \times \sigma) + \mu \quad \text{Equation 1}$$

For example, assume that the solution architect forecasts $\mu_{12}$ to be 88.8% and $\mu_{12}$ to be 1.5% for the performance of a particular SLA metric. Upon running the simulation, the model will select a random sequence number, say point 456, returning x = 0.907 from the probability distribution. Thus, $$x_{simulated} = (x_{random} \times \sigma) + \mu = (0.907 \times 1.5\%) + 88.8\% = 90.2\% \quad \text{Equation 2}$$

Figure 2:
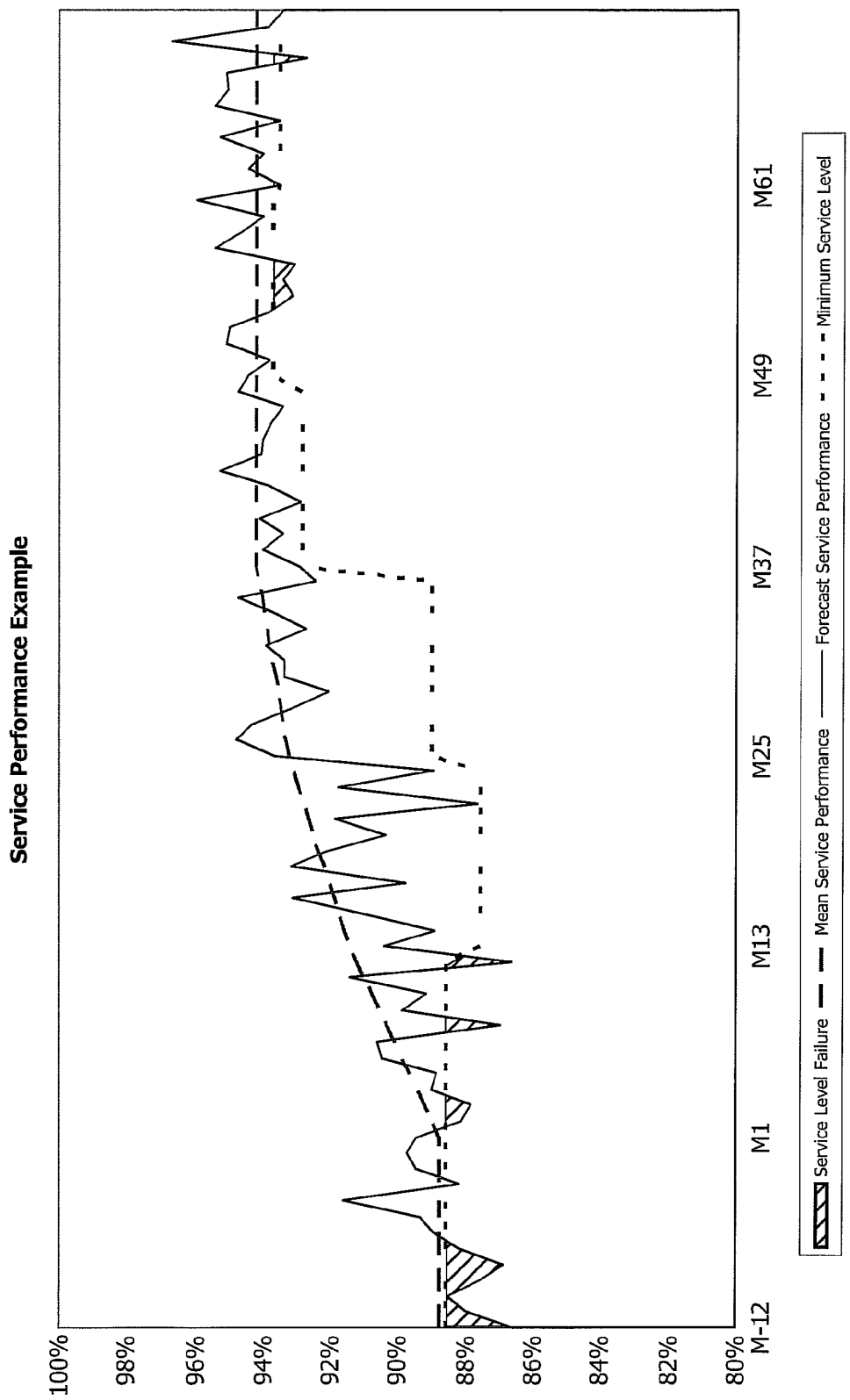
FIG. 2 illustrates a graphical example of the projected performance of a SLA metric over the SLA lifespan, in accordance with one embodiment.

The result, 90.2%, is then used as the projected performance data point for Month 12 of a SLA metric. FIG. 2 illustrates a graphical example of the projected performance of a SLA metric over the SLA lifespan as described above. The combination of the forecasted mean and standard deviation allows the data module 110 to model the projected service performance, as shown by the fluctuating solid line in FIG. 2.

The scenarios module 120 is operable to define SLA scenarios for comparison with the projected performance data of SLA metrics as generated from performance models developed in the data module 110. For example, a service provider may wish to compare the projected performance of one or more SLA metrics with diverse SLA scenarios based on, for example, customer-proposed and service-provider-proposed performance targets for the same SLA metrics, in order calculate the service provider's exposure to penalties for performance failures. Thus, the scenarios module 120 is operable to define SLA scenarios, each including defined performance targets for one or more SLA metrics and associated definitions or rules. Examples of the performance targets and associated definitions include but are not limited to minimum service level (MSL), target service level (TSL), superior service level (SSL), failure definition and earn-back definition. The MSL is the minimum performance level that the service provider must achieve in order to avoid a potential performance failure (hereinafter, "potential failure"). The TSL is a more ambitious level of performance that may allow a service provider to earn back credits to offset previous penalties (debits) for potential failures. The SSL is similar in concept to the TSL, but at a higher level may also allow the service provider to receive credits above any earn-back credits.

The performance targets (e.g., MSL, TSL, SSL) for each performance metric in each SLA scenario may be calculated based on past actual performance or input directly into the scenarios module 120 based on customer requirements. The construction of calculated performance targets for each SLA metric is described next, and any customer-input performance targets may be entered on top of the calculated ones. In one embodiment, the performance targets, as defined by the customer or the service provider, for a desired evaluation period (e.g., a contract year) may be based on an evaluation of performance in a previous evaluation period. For example, the performance targets for Year 2 (Y2) may be based on a statistical assessment of the service performance of the service provider in Year 1 (Y1). For compatibility, it should be noted that the desired evaluation period for performance targets is of the same length as the long-term periods for which there are predicted means and standard deviations for generating performance models in the data module 110.

There are a number of possible techniques for this statistical assessment. For example, one technique involves a calculation of a simple average of the highest or lowest results from the evaluation period. Another technique is based on a certain number of standard deviations away from the mean of the evaluation period. Both of these techniques are explained in more detail below with respect to MSL, TSL, and SSL performance targets, wherein each evaluation period is one SLA contract year as an example. However, it should be understood that the techniques are applicable for an evaluation period of any length. Also, other techniques may be used for performance targets other than the MSL, TSL, and SSL to define the various SLA scenarios.

The MSL performance target may be calculated as a simple average, which is the average of a predetermined n number of lowest-performing results from the previous year. For example, the customer may desire the MSL for Y2 to be equal to the average of the three lowest results for Y1. Alternatively, the MSL may be based on the standard deviation of the previous year's results. The inventors have discovered that using this standard deviation technique allows the modeling tool 100 to ignore any extreme outliers that may skew the results. For example, the customer may desire the MSL for Y2 to be set to one standard deviation lower than the mean of Y1.

For the TSL and SSL, they also may be calculated as a simple average, which is a slight modification from the simple-average technique used for the MSL. That is, instead of using the lowest-performing results from the previous year, the TSL and SSL employ the highest results. Alternatively, the TSL or SSL may be based on the standard deviation of the previous year's results, which again is a slight modification from the standard-deviation technique used for the MSL. That is, instead of selecting one standard deviation lower than the mean of Y1, the TSL or SSL may select one standard deviation higher than the mean of Y1 as their target levels.

The forecasting module 130 accesses the performance model created by the data module 110 to evaluate the projected service performance data against the different SLA scenarios, with performance targets therein, as defined by the scenarios module 120 in order to calculate the service provider's exposure to financial penalties for performance failures. In one embodiment, performance failures are measured in terms of potential performance failures (or "potential failures") and actual performance failures (hereinafter, "actual failures") as described below. Thus, the forecasting module 130 is operable to perform prediction or forecasting of SLA metric performance throughout a SLA lifespan instead of just the annual mean and standard deviation of the SLA metric performance.

As noted earlier, a potential failure for a particular month is determined by assessing the service performance data point of the SLA for that month, as calculated in the data module 110, against a corresponding MSL performance target for the SLA, as found in a particular scenario that has been defined in the scenarios module 120. In one example, if the data point is lower than the MSL performance target, a potential failure is recorded. Similarly a TSL-exceeded (or SSL-exceeded) indication for a particular month is determined by assessing the service performance data point of the SLA for that month against a corresponding TSL (or SSL) performance target for the SLA, as found in a particular scenario that has been defined in the scenarios module 120. If the data point is higher than the TSL (or SSL) performance target, a TSL-exceeded indication is recorded. Accordingly, an actual failure indication is a potential failure that is registered as an actual failure based on the earn-back rules or definitions. For example, a potential failure is registered as an actual failure if the service provider has not managed to earn back a potential failure by exceeding the TSL (or SSL) at any point in the next predetermined time period (e.g., six months). It should be understood that other earn-back rules or definitions may be applied here as well.

The forecasting module 130 is operable to run a simulation of the projected performance data generated by the data module 110 against any of the SLA scenarios defined by the scenarios module 120 in order to calculate the long-term (e.g., each contract year) average number of actual failures for each SLA of interest. Then, associated financial risks of the service provider may be assessed based on the calculated average of actual failures. In one embodiment, a Monte Carlo simulation is employed to compute the average number of potential and actual failures over a high number of iterations, which may be selected by users of the model tool 100—the trade-off being accuracy vs. processing time. In effect, for each iteration of the Monte Carlo simulation, the random probability distribution of the service performance data for each SLA metric is re-calculated in the data module 110 as described above in Equation 1, and the number of failures for each iteration is recorded.

Figure 3:
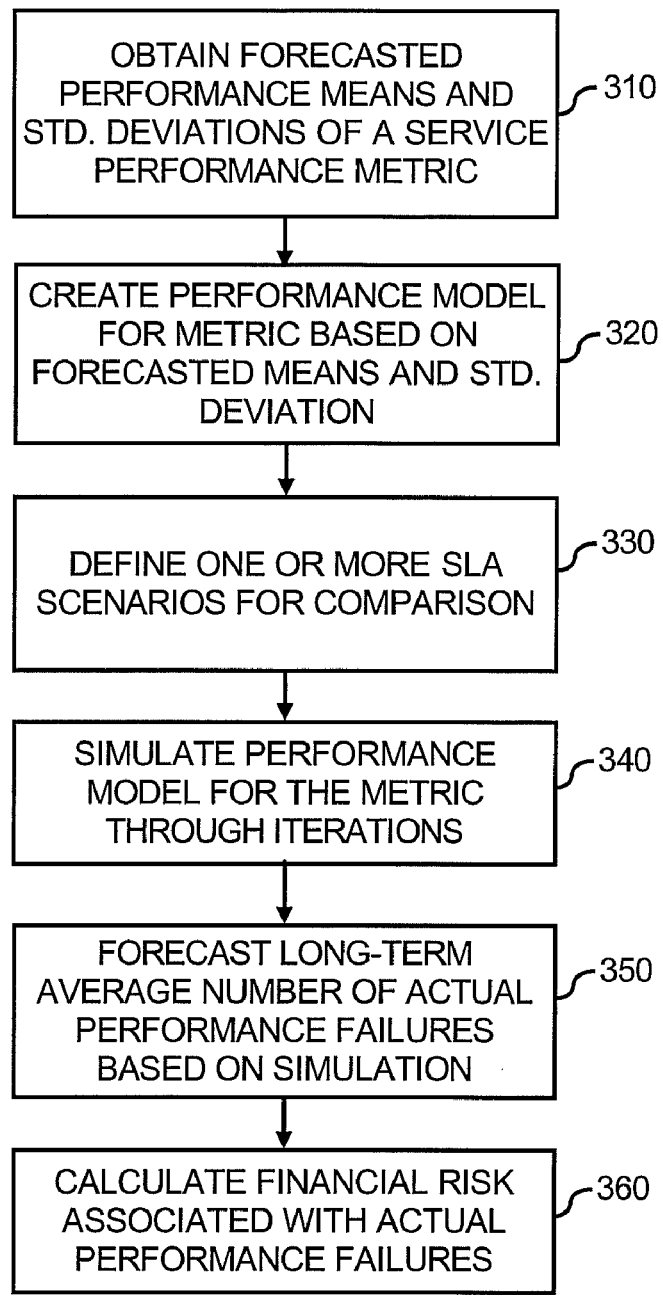
FIG. 3 illustrates a flowchart diagram of a method for modeling and forecasting service performance of SLAs, in accordance with one embodiment.

FIG. 3 illustrates a flowchart diagram of a method 300 for modeling and forecasting service performance of SLAs, in accordance with one embodiment. For illustrative purposes only and not to be limiting thereof, the method 300 is discussed in the context of the system 100 illustrated in FIG. 1.

At 310, the performance model 100 directs its data module 110 to obtain the forecasted performance means and standard deviations of each desired performance metric in a SLA of interest. A forecasted mean and standard deviation is obtained for each long-term period for the entire lifespan of the SLA. As noted earlier, the forecasted performance means and standard deviations may be provided by solution architects and input into the data module 110. Alternatively, the data module 110 may calculate such means and standard deviations through software implementation of any known algorithms used by the solution architects for the same purpose. In a running example, a service provider is in negotiation with a customer to provide one or more services in accordance with a proposed SLA. Thus, the service provider wishes to evaluate the contractual terms in a SLA for possible performance failures and associated financial risks that the service provider may incur in the future prior to entering into SLA with the customer. Accordingly, the service provider first obtains the forecasted performance means and standard deviations for the desired SLA metrics on an annual periodic basis and over the entire SLA lifespan. The annual periodic basis is the long-term periodic basis chosen by either the customer or service provider to evaluate the service performance of the proposed SLA. The desired SLA metrics may be extracted from the contractual terms in the proposed SLA with customer-desired performance levels or targets.

At 320, the performance model 100 directs its data module 110 to create or generate a performance model for a desired SLA performance metric based on the forecasted performance means and standard deviations, using the standard normal distribution for the performance model as described earlier. For the running example, the service provider uses the forecasted performance means and standard deviations to generate a performance model for each desired SLA metric.

At 330, the performance model 100 directs its scenarios module 120 to define one or more SLA scenarios for comparison with the projected performance data of desired SLA metrics that may be generated by the performance models developed in the data module 110. Defining each SLA scenario includes defining performance targets for the desired SLA metrics and any associated definitions or rules so as to model the SLA scenario. The performance target for each SLA metric may be provided by a user of the model tool 100, such as a service provider or a customer. Thus, for the running example, as noted above, one or more SLA scenarios may be defined based on the performance targets for desired SLA metrics and associated definitions or rules (e.g., for financial rewards or penalties) that may be extracted from the contractual terms in the proposed SLA. Additional SLA scenarios may be defined based on performance targets in alternative contractual terms for the proposed SLA that the service provider, the customer, or both wish to explore to determine any exposure of financial risk.

At 340, the performance model 100 directs its forecasting module 130 to simulate the performance model for each desired SLA metric through a predetermined number of iterations to calculate the long-term average number of actual failures based on each defined SLA scenario at 330. For each iteration, the random probability distribution is re-calculated for each performance model in accordance with Equation 1 described earlier, and projected performance data for a desired SLA metric is generated, which is then compared with the defined performance targets in each defined SLA scenario to determine if there is an actual failure. Thus, for the running example, the service provider uses the performance model 100 to run a simulation of a performance model for each desired SLA metric for a predetermined number of iterations for each year.

At 350, the forecasting module provides a prediction or forecast of the long-term average number of actual failures by combining the failure results from the multiple iterations of the simulation to calculate the long-term average number of actual failures for each long-term period. Thus, for the running example, the performance model 100 provides the service provider with a forecast of the average number of actual failures per year, throughout the SLA lifespan, for each desired SLA metric in each defined SLA scenario.

At 360, the service provider may manually or, through software-implementation, automatically calculate the financial risks associated with the average number of failures for each desired SLA metric. For the running example, the service provider may calculate the financial risks based on the contractual terms in the proposed SLA. For example, assuming that the proposed SLA contractual terms requires a penalty in the form of a 1% discount of the total service fee to be charged to the customer by the service provider for every 5 actual failures each year. Thus, the service provider is able to assess the proposed SLA and associated financial risks to the service provider.

Accordingly, the modeling tool or framework as described above allows a service provider to obtain forecasted performance data of a SLA, define one or more SLA scenarios based on selected or negotiated SLA terms, and apply the forecasted SLA performance to the defined scenarios in order to assess the financial risks associated with each scenario. Thus, the modeling tool is operable to provide direct quantitative comparison of multiple SLAs, whereby trade-off can be made between one SLA and another by comparing the overall financial risks to the service provider that offers the multiple SLAs to the same customer. The modeling tool also allows substitution with actual data where available. Consequently, a service provider is able to more easily calculate the percentage of financial risks (e.g., service fees) using the forecasted number of failures.

Figure 4:
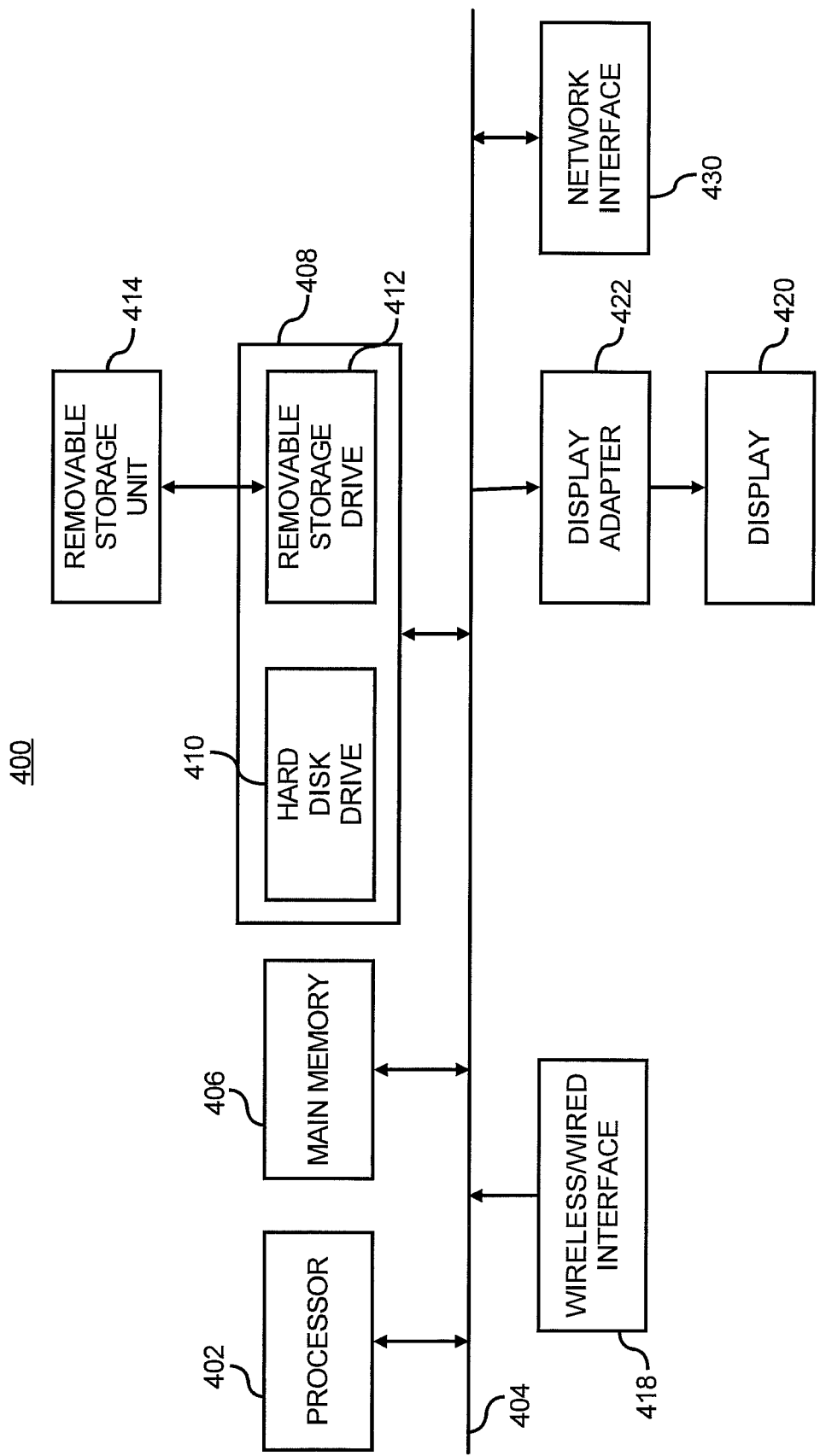
FIG. 4 illustrates a block diagram of a computerized system that is operable to be used as a platform for implementing the performance model illustrated in FIG. 1, or a part thereof, or the method illustrated in FIG. 3, or a part thereof, in accordance with one embodiment.

FIG. 4 illustrates a block diagram of a computerized system 400 that is operable to be used as a platform for implementing the entire performance model 100 or any one or combination of the modules 110-130 therein, along with the method 300. It should be understood that a more sophisticated computerized system is operable to be used. Furthermore, components may be added or removed from the computerized system 400 to provide the desired functionality.

The computer system 400 includes one or more processors, such as processor 402, providing an execution platform for executing software. Thus, the computerized system 400 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 402 are communicated over a communication bus 404. The computer system 400 also includes a main memory 406 where software is resident during runtime, and a secondary memory 408. The secondary memory 408 may also be a computer-readable medium (CRM) that may be used to store software programs, applications, or modules that implement the methods 200 and 300, or parts thereof. The secondary memory 408 may have installed therein computer-executable programming code, such as a software spreadsheet program, to implement any one or a combination of the modules 110-130 and a part or all of the method 300 in any manner known in the art for program coding.

The main memory 406 and secondary memory 408 (and an optional removable storage unit 414) each includes, for example, a hard disk drive and/or a removable storage drive 412 representing a floppy diskette drive, a magnetic tape drive, a compact disk drive, etc., or a nonvolatile memory where a copy of the software is stored. In one example, the secondary memory 408 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. The computer system 400 includes a display 420 connected via a display adapter 422, user interfaces comprising one or more input devices 418, such as a keyboard, a mouse, a stylus, and the like. However, the input devices 418 and the display 420 are optional. A network interface 430 is provided for communicating with other computer systems via, for example, the network 120.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for modeling a financial risk in a service level agreement (SLA) between a service provider and a customer for the service provider to provide one or more services to the customer, the method comprising:
    forecasting, by a processor, a service performance of the service provider for at least one performance metric of the SLA, wherein the forecasting comprises
    computing one or more performance failures in the forecasted service performance for the at least one SLA performance metric based on a plurality of performance targets, and a first one of the plurality of performance targets indicates a minimum service level (MSL) to be achieved by the service provider, and a second one of the plurality of performance targets indicates a higher service level to be achieved by the service provider to obtain an earn-back credit in an event the MSL is not achieved by the service provider;
    modeling at least one scenario for the SLA based on one or more negotiated terms between the service provider and the customer as found in the SLA; and
    applying the forecasted service performance of the service provider against the at least one modeled SLA scenario to calculate a financial risk of the service provider with regard to the at least one modeled SLA scenario.

2. The method of claim 1, wherein the financial risk of the service provider is based one or more contractual terms in the SLA that provide a financial fee for the service provider in exchange for the one or more services provided to the customer.

3. The method of claim 1, wherein applying the forecasted service performance comprises:
    applying the forecasted service performance of the service provider against the at least one modeled SLA scenario through a plurality of iterations in a simulation.

4. The method of claim 1, wherein computing one or more performance failures comprises:
    computing a long-term average number of performance failures through the plurality of iterations in the simulation.

5. The method of claim 4, wherein the simulation is a Monte Carlo simulation.

6. The method of claim 1, wherein forecasting the service performance of the service provider comprises:
    obtaining at least one mean value and a corresponding variability value of the at least one SLA performance metric; and modeling the service performance of the service provider for the at least one SLA performance metric based on the at least one mean value and the corresponding variability value.

7. The method of claim 1, wherein modeling at least one scenario for the SLA comprises:
defining one or more financial rules associated with the plurality of performance targets, and the one or more financial rules contribute to the financial risk of the service provider.

8. A method for modeling and forecasting service performance of a service level agreement (SLA), comprising:
obtaining at least one mean value of a performance metric for the SLA and at least one variability value of the performance metric;
deriving a performance model of the SLA performance metric based on the at least one mean value and the at least one variability value;
defining a SLA scenario that includes at least one predetermined performance target for the SLA performance metric, wherein the at least one predetermined performance target includes a first performance target and a second performance target for the SLA performance metric, and the first performance target is a predetermined performance level that a service provider in the SLA must at least achieve to avoid a potential performance failure and the second performance target is a predetermined performance level that enables the service provider to offset the potential performance failure;
simulating, by a processor, the performance model in view of the defined SLA scenario for a predetermined number of iterations; and
forecasting an average number of performance failures against the defined SLA scenario based on the simulating of the performance model.

9. The method of claim 8, wherein the SLA is between the service provider and a service customer for the service provider to provide at least one service to the service customer, the method further comprises:
deriving a financial risk of one of the service provider and the service customer based on at least the forecasted average number of performance failures.

10. The method of claim 8, wherein:
the at least one mean value of the performance metric includes a plurality of mean values, each is for a predetermined time period within a lifespan of the SLA so that the plurality of mean values are provided for all of the SLA lifespan; and
wherein the at least one variability value of the performance metric includes a plurality of variability values, each corresponding to one of the plurality of mean values.

11. The method of claim 8, wherein deriving the performance model comprises:
deriving the performance model based on a normal distribution curve with a predetermined number of value points on the normal distribution curve.

12. The method of claim 8, wherein simulating the performance model comprises:
a) for each one of the predetermined number of iterations,
a1) randomly selecting a value point from the predetermined number of value points on the normal distribution curve; and
a2) deriving a projected performance data point for the SLA performance metric based on the at least one mean value, the at least one variability value, and the randomly selected value point.

13. The method of claim 12, wherein simulating the performance model further comprises:
a) for each one of the predetermined number of iterations,
a3) comparing the projected performance data point for the SLA performance metric with the at least one predetermined performance target for the SLA performance metric; and
a4) forecasting a performance failure based on the comparing.

14. The method of claim 13, wherein forecasting an average number of performance failures comprises:
averaging the performance failures forecasted from all of the predetermined number of iterations.

15. The method of claim 8, wherein defining the SLA scenario comprises:
obtaining observed values of the SLA performance metric in a first one of the predetermined time periods within a lifespan of the SLA;
defining the at least one predetermined performance target for the SLA performance metric in a second one of the predetermined time periods based on the observed values in the first predetermined time period, wherein the second predetermined time period is subsequent to the first predetermined time period.

16. A non-transitory computer-readable medium on which is encoded computer executable programming code that includes computer execution instructions to:
forecast a service performance of the service provider for at least one performance metric of the SLA, wherein the instructions to forecast further comprise instructions to compute one or more performance failures in the forecasted service performance for the at least one SLA performance metric based on a plurality of performance targets, and a first one of the plurality of performance targets indicates a minimum service level (MSL) to be achieved by the service provider, and a second one of the plurality of performance targets indicates a higher service level to be achieved by the service provider to obtain an earn-back credit in an event the MSL is not achieved by the service provider;
model at least one scenario for the SLA based on one or more negotiated terms between the service provider and the customer as found in the SLA; and
apply the forecasted service performance of the service provider against the at least one modeled SLA scenario to calculate a financial risk of the service provider with regard to the at least one modeled SLA scenario.

* * * * *